J. M. KENNEDY.
STOCK YOKE.
APPLICATION FILED NOV. 28, 1917
1,280,234.
Patented Oct. 1, 1918.
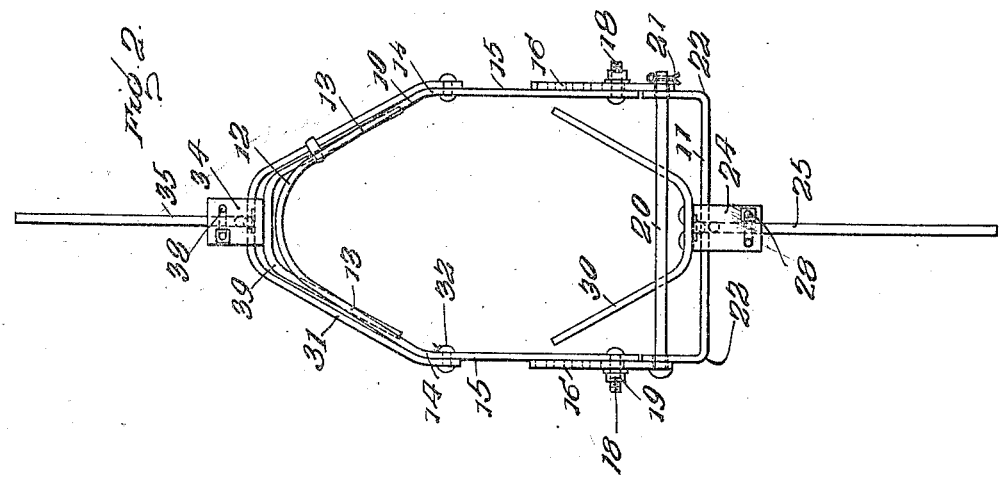
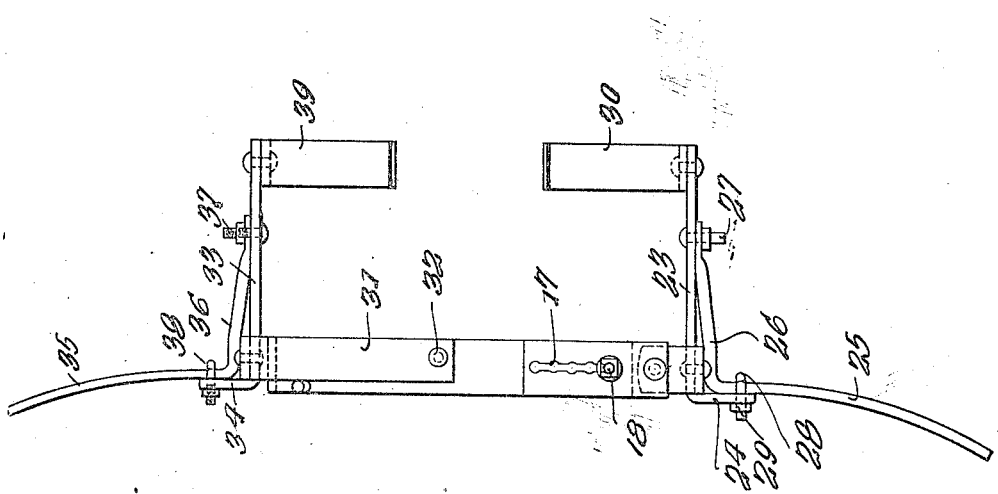
INVENTOR
James M. Kennedy
WITNESSES
BY
ATTORNEY

UNITED STATES PATENT OFFICE.

JAMES M. KENNEDY, OF HIRAM, GEORGIA.

STOCK-YOKE.

1,280,234.   Specification of Letters Patent.   Patented Oct. 1, 1918.

Application filed November 28, 1917. Serial No. 204,406.

*To all whom it may concern:*

Be it known that I, JAMES M. KENNEDY, a citizen of the United States, residing at Hiram, in the county of Paulding and State of Georgia, have invented certain new and useful Improvements in Stock-Yokes, of which the following is a specification.

This invention has relation to animal yokes, and has for an object to provide a yoke formed of a pair of sections for embracing the neck of the animal with means for disconnectably connecting the sections together.

Another object of the invention is to provide an animal yoke including means for embracing the neck of an animal, and a pair of elements pivotally mounted thereon with outwardly extending spurs whereby the engagement of the spurs with any object will cause the elements to move to grip the neck of the animal and thereby cause the animal to desist from attempting to release itself.

A still further object of the invention is to provide a yoke particularly designed for cattle, but constructed in a manner to permit application to horses, to this end the several parts being interchangeable.

A still further object of the invention is to provide an animal yoke having the characteristic above set forth constructed in a manner to permit its adjustment to embrace the necks of cattle in various degrees of growth.

In addition to the foregoing my invention comprehends improvements in the details of construction, and arrangement of the correlative parts to be hereinafter more fully described and particularly set forth in the appended claim.

In the accompanying drawings in which similar and corresponding parts are designated by the same characters of reference throughout the several views in which they appear:—

Figure 1, is a view in side elevation of my improved animal yoke, and

Fig. 2, is a view thereof in front elevation.

With reference to the drawings, 10 and 11 indicate respectively the upper and lower halves of my improved cattle yoke, designed for connection after embracing the parts around the neck of the animal. The upper part 10 is formed of a strip of iron or other suitable material bent at an intermediate portion as indicated at 12, and curved so as to engage the upper side of the neck of the animal, and then bent downwardly in diverging relation to form the side members 13, the terminals being then bent as at 14 toward parallelism to depend, one at each side of the neck. Secured exteriorly to the lower end of each side member of the yoke which members are indicated at 15, is an adjusting strip 16 which is formed with a longitudinally extending slot 17 to receive bolts 18 which extend through apertures in said members 15 of the upper member of the yoke and through said slot. Nuts 19 are applied to the bolts subsequent to their introduction in the manner above set forth whereby to secure the strip 16 to the members 15 and to permit adjustment of said strip 16 to lengthen or shorten the said members 15.

The lower end of each strip 16 is apertured to receive a bolt 20 which extends across the lower end of the upper member 10 of the yoke and serves to connect the lower end of said strip 16, a cotter pin 21 being inserted in the projecting end of the bolt to retain the same in place in connection with a head provided upon the other end of the bolt. The lower member 11 is formed of a strip of material corresponding to the material from which the upper member of the yoke is formed and of corresponding thickness, and is bent at portions adjacent the ends as indicated at 22, and the terminals of the lower member 11 are threaded to receive the bolts 20 mentioned above. The terminals engage the inner surfaces of the strips 16, and it will be noted that the member 11 is thus pivoted for movement on the bolt 20.

Secured to the member 11 is a bar 23 which extends forwardly, the bar being secured to the intermediate portion of the said member 11, the rear end of the member 23 being bent downwardly as indicated at 24. A spur 25 is provided in the nature of a rod having one end bent at right angles to form the member 26 which is disposed in contiguous relation to the member 23 with the terminal of said member 26 apertured to receive a bolt 27 which also extends through an aperture in the bar 23. The spur 25 is secured to the depending portion 24 of the bar 23 at a point beyond the point of flexure of the member 25 by means of a U-bolt 28 whose terminals are inserted through openings in said depending portion 25. Nut 29 is then applied to the terminal of the U-bolt. To the free end of the bar 23 there is applied a choking member in the form of a strip 30, secured at a point intermediate its ends to end of said bar 23 and the terminals of said bar 30 are bent upwardly in diverging relation.

A yoke 31 is provided upon the upper end of the device in the nature of a strip, bent at an intermediate point to dispose its terminals in diverging relation, to lie in contiguous relation to and exteriorly of the members 13 of the upper yoke the extremities of the yoke 31 being apertured to receive rivets 32 which enter openings in the upper yoke 10 whereby to mount the yoke 31 for pivotal movement. To the intermediate portion of the yoke 31, which is in spaced relation at its upper portion to the member 10, is secured a forwardly extending bar 33 similar to the above mentioned bar 23, with its rear end bent upwardly as at 34. A spur 35 is provided to extend upwardly and is curved in a rearward direction, with its lower end bent at right angles to form the portion 36 which is apertured to receive a bolt 37 extending through an opening in the bar 33. A U-bolt 38 is also provided to assist in securing the member 35, the U-bolt engaging the same adjacent its bent portion and has its terminals inserted through openings in the upwardly projecting portion 34 of the bar 33. To the free extremity of the bar 33 there is provided a second choking member in the nature of a bar 39, secured at a point intermediate its ends to said bar 33 with terminals directed downwardly in converging relation and in opposition to the terminals of the members 30 whereby to engage the upper side of the neck of the animal, the member 30 engaging the under side thereof.

To apply the yoke to the neck of an animal, the lower member 11 is disconnected from the upper member by removing the bolt 20. The upper member 10 is then placed upon the neck of the animal and the lower member 11 applied to the under side of the neck and in a position to permit the bolt to be reinserted. The strip 16 may be adjusted relatively to the member 10 of the yoke to correspond to the width of the neck of the animal. With the yoke thus applied it will be obvious that the members 30 and 39 are engaged against the under and upper sides respectively of the neck of the animal and the spurs 25 and 35 will be connected downwardly and upwardly. Upon the engagement of the spurs 25 and 35 with any obstruction it will be obvious that the members 30 and 39 will be moved toward each other so as to grip the neck of the animal. The animal will be choked which will effectively prevent any attempt to release itself.

By removing the spur 35, which is longer than the spur 25 and inserting it in place of the spur 25, transferring said spur 25 to the location of the other spur, the yoke will be then adapted for use upon a horse.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claim.

Having thus described my invention what I claim as new and desire to secure by Letters Patent is:—

A stock yoke including arcuate members operatively connected for relative movement to encircle the neck of the animal, bars secured to said arcuate members to extend laterally therefrom, each bar bent to form a short terminal and a long terminal, a choking member secured to the long terminal, a pair of spurs, each having one end bent at an angle to lie in contiguous relation to the bars, bolts having hook shaped terminals secured in the short terminals of the bar to embrace the spurs to prevent movement thereof, and bolts and nuts serving to adjustably secure the bent terminals of the spurs to the bars to permit adjustment of the spurs relative to the bars.

In testimony whereof I affix my signature in presence of two witnesses.

JAMES M. KENNEDY.

Witnesses:
L. L. BRASELTON,
J. W. MOON.